No. 679,043. Patented July 23, 1901.
M. F. WIRTZ.
PEDAL.
(Application filed Aug. 29, 1900.)
(No Model.)
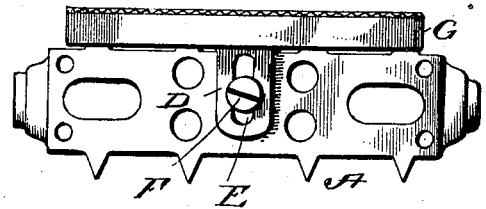
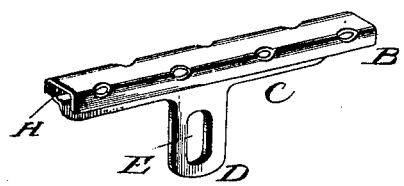
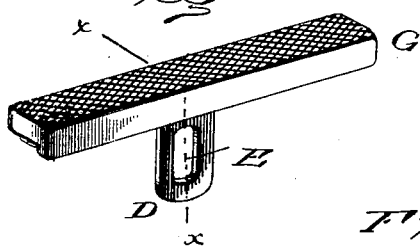
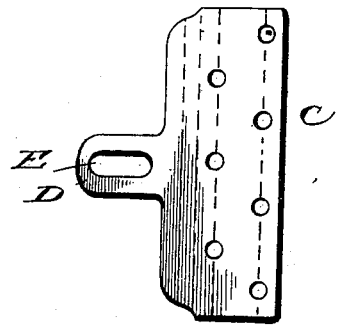
Witnesses
Inventor
Max. F. Wirtz

UNITED STATES PATENT OFFICE.

MAX F. WIRTZ, OF DUNELLEN, NEW JERSEY.

PEDAL.

SPECIFICATION forming part of Letters Patent No. 679,043, dated July 23, 1901.

Application filed August 29, 1900. Serial No. 28,449. (No model.)

*To all whom it may concern:*

Be it known that I, MAX F. WIRTZ, a citizen of the United States, residing at Dunellen, in the county of Middlesex and State of New Jersey, have invented certain new and useful Improvements in Pedals; and I do hereby declare the following to be a full, clear, and exact description of the invention, such as will enable others skilled in the art to which it appertains to make and use the same.

My invention relates to certain new and useful improvements in pedals for bicycles, and particularly to that class known as "rat-trap" pedals.

In the class of pedals referred to the sides of the frame are composed of sheet metal and constitute longitudinal bars upon which the foot of the rider rests. In order to prevent any slipping of the feet while propelling the bicycle, the edges of the side bars of the pedal are formed with angular or pointed projections or spurs to catch into and hold the sole of the foot.

My invention has for its object to provide such a pedal with a removable foot-rest provided with a rubber covering in order that the pedal may be used in either way, as may be preferred; and with this end in view my invention consists in the details of construction of a foot-rest composed of sheet metal provided with a rubber coating or cushion and adapted to be readily attached to or removed from an ordinary rat-trap pedal, as will be hereinafter more fully described.

In order that those skilled in the art to which my invention appertains may know how to make and use my invention and fully understand its advantages, I will proceed to describe the same, referring by letters to the accompanying drawings, in which—

Figure 1 is a side elevation of a rat-trap pedal with my improved foot-rest secured in position thereon. Fig. 2 is a perspective view of the sheet-metal core of the rubber-covered foot-rest. Fig. 3 is a similar view with the sheet-metal core provided with its rubber covering. Fig. 4 is a central cross-section on the line $x\,x$ of Fig. 3; and Fig. 5, a plan view of the blank from which the core or body is formed, the broken lines indicating the points at which it is bent to produce the form shown at Fig. 2.

Similar letters of reference denote like parts in the several figures of the drawings.

A represents the side bar of an ordinary rat-trap pedal, and B the spurs formed on the edges thereof.

C is the sheet-metal core or body of my improved foot-rest, which is formed of a single piece of sheet metal bent into the form shown at Fig. 2 and with a central downwardly-projecting tongue or ear D, provided with an elongated opening or slot E, through which may be passed a screw F, by means of which and a suitable nut the foot-rest may be adjustably secured to the side bar of the pedal-frame, as clearly shown at Fig. 1.

G is a rubber coating which is cast or molded upon the core C, which latter is formed with a series of small orifices which permit the rubber in its plastic state and before vulcanization to enter and to constitute holding devices for securing the rubber in its fixed relation to the core.

It will be seen by reference to Fig. 2 that the core or body B is bent into rectangular form in cross-section and with the edge upon which the ear D is formed bent inwardly and downwardly, so that the ear occupies a central position both longitudinally and transversely. The opposite edge of the blank is bent downwardly and terminates in the same plane with inwardly-bent portion of the opposite edge of the blank, as clearly shown in cross-section at Fig. 4. This formation results in a longitudinal gateway or opening H for the entrance of the upper edge of the side bar B of the pedal-frame. This construction also enables the rubber coating G to envelop the vertical wall of the core opposite the ear D and to extend upwardly, as clearly shown at Fig. 4. The rubber entering the orifices on the opposite side is flattened out on the inside, as clearly shown in dotted lines, so that each side of the longitudinal gateway is rubber-faced, and when the foot-rest is properly secured in position upon the pedal the edge of the side bar is confined between rubber faces, and consequently no rattling noise can take place between the side bar B and the body of the foot-rest, and the two are maintained in fixed and rigid relation. It will be seen that my improved foot-rest when completed has the entire sheet-metal core or body, with the exception of a portion of the ear or tongue D, coated with and concealed by the rubber covering, and by reference to Fig. 5 it will be seen that the form of the shanks is such that they may be stamped from sheet metal with little or no waste of material, and hence can be produced with great economy.

I am aware that it is not new, broadly, to make a foot-rest of a sheet-metal body having parallel clamping-plates and adapted to be secured adjustably upon the side bars of rat-trap pedals, and I do not wish to be understood as laying claim, broadly, to any such construction; but, Having described the construction and advantages of my improved foot-rest, what I claim as new, and desire to secure by Letters Patent, is—

1. In rat-trap, and similar pedals for bicycles, a detachable foot-rest composed of a sheet-metal core or body bent into substantially the form shown, and with a single centrally-projecting ear or tongue provided with an elongated opening to receive a securing-screw, the core or body coated or covered exteriorly with rubber, substantially as and for the purpose set forth.

2. The sheet-metal core or body bent into the form shown and described and provided with a rubber cover or coating exteriorly, and with interior rubber faces each side of the gateway in said body, substantially as and for the purposes set forth.

In testimony whereof I affix my signature in presence of two witnesses.

MAX F. WIRTZ.

Witnesses:
A. W. EINSTEIN,
L. VAN NOSTRAND.